(12) United States Patent
Ham

(10) Patent No.: US 8,611,580 B2
(45) Date of Patent: Dec. 17, 2013

(54) CHEEK STABILIZER FOR AUDIO HEADSET

(75) Inventor: Soohyun Ham, San Francisco, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1026 days.

(21) Appl. No.: 11/351,491

(22) Filed: Feb. 9, 2006

(65) Prior Publication Data

US 2013/0310113 A1   Nov. 21, 2013

Related U.S. Application Data

(60) Provisional application No. 60/660,301, filed on Mar. 9, 2005.

(51) Int. Cl.
*H04R 25/00*   (2006.01)

(52) U.S. Cl.
USPC .................. 381/380; 381/375; 455/569.1

(58) Field of Classification Search
USPC ............... 381/370, 379, 380, 381, 374, 375; 379/430; 455/569.1
See application file for complete search history.

(56) References Cited

U.S. PATENT DOCUMENTS

| | | | | |
|---|---|---|---|---|
| 6,038,329 | A * | 3/2000 | Lee | 381/370 |
| 6,097,827 | A * | 8/2000 | Yang | 381/375 |
| 6,374,090 | B1 * | 4/2002 | Morales | 455/90.1 |
| 6,721,433 | B2 * | 4/2004 | Sato | 381/379 |
| 6,754,361 | B1 * | 6/2004 | Hall et al. | 381/370 |
| 7,076,277 | B2 * | 7/2006 | Kim et al. | 455/569.1 |
| 2001/0017926 | A1 * | 8/2001 | Vicamini | 381/380 |
| 2002/0048385 | A1 * | 4/2002 | Rosenberg | 381/374 |
| 2002/0131585 | A1 | 9/2002 | Jones et al. | |
| 2003/0003969 | A1 | 1/2003 | Tong et al. | |
| 2003/0157972 | A1 * | 8/2003 | Bae | 455/568 |
| 2006/0068857 | A1 * | 3/2006 | Asseily | 455/575.2 |

FOREIGN PATENT DOCUMENTS

| | | |
|---|---|---|
| JP | 1064682 A | 6/1998 |
| JP | 10164682 A | 6/1998 |

* cited by examiner

*Primary Examiner* — Davetta W Goins
*Assistant Examiner* — Phylesha Dabney
(74) *Attorney, Agent, or Firm* — Andre Tacdiran

(57) ABSTRACT

Cheek stabilizers for audio headsets are disclosed. The audio headset generally include a headset body having first and second regions for positioning near a user's ear and toward the user's mouth, respectively, and a stabilizer extending from the second region of the headset body, the stabilizer being configured to position the second region at a distance away from the user's cheek. The stabilizer may facilitate positioning any metal contacts on the headset body away from the user. The stabilizer may be inverted U-shaped to form a channel over the metal contact or may be configured as one or more ribs disposed adjacent to the metal contact. The stabilizer may also facilitate in positioning a microphone port away from the user's cheek. Where the headset is used with an earpiece worn in the ear, the stabilizer may facilitate maintaining the earpiece within the user's ear.

16 Claims, 2 Drawing Sheets

CHEEK STABILIZER FOR AUDIO HEADSET

CROSS REFERENCE TO RELATED APPLICATIONS

This application claims priority to U.S. Provisional Patent Application Ser. No. 60/660,301, filed on Mar. 9, 2005 entitled "Cheek Stabilizer for Audio Headset," which is incorporated herein by reference in its entirety.

BACKGROUND OF THE INVENTION

1. Field of the Invention

The present invention relates generally to headsets for use in audio applications such as telecommunications and telephony. More specifically, cheek stabilizers for audio headsets are disclosed.

2. Description of Related Art

Audio headsets such as communication headsets are used in numerous applications. Communication headsets are particularly effective for telephone operators, radio operators, aircraft personnel, and for any user for whom it is desirable to have hands free operation of communication systems. Accordingly, a wide variety of communication headsets are available. For example, communication headsets may be adapted for use with corded and cordless conventional telephones, soft phones, cellular or mobile telephones, and the like.

One type of communication headset is a monaural headset. Monaural headsets are headsets that have only a single audio receiver for placement near one ear. Such headsets may be very compact.

However, many audio headsets, particular those that are very compact, may be unstable when it is worn on a user's ear. For example, an audio port for the microphone may be blocked by the user's cheek and/or facial hear, resulting in poor sound quality. In addition, with rechargeable cordless headsets, a charging pad for the headset may come in contact with the user's skin (e.g., the cheek) and may cause skin irritation. Although some headsets have recessed areas for the charging pads, such recessed configurations tend to collect dirt and are difficult to clean.

Monaural headsets may be implemented with an earloop or earhook that is configured to fit around the ear to help secure and stabilize the receiver of the headset in place. However, because of the large natural variations in the size, shape, and orientation of human ears, earloops often do not fit snugly and thus may not provide sufficient stability. In addition, earloops may be uncomfortable for a large spectrum of potential users. Furthermore, the ergonomic goals of stability and comfort are often in conflict since a snug fit that provides a secure attachment for the headset often pinches the user's ear or creates pressure points that are uncomfortable for many users, particularly when the headset is worn for extended periods of time. Moreover, a snug fit precludes the ability for the user to easily don and doff the headset with only one hand.

Thus it would be desirable to provide an audio output device or headset that is easy to wear, comfortable for the user when worn and provides sufficient stability.

SUMMARY OF THE INVENTION

Cheek stabilizers for audio headsets are disclosed. It should be appreciated that the present invention can be implemented in numerous ways, including as a process, an apparatus, a system, a device, or a method. Several inventive embodiments of the present invention are described below.

The audio headset generally include a headset body having first and second regions for positioning near a user's ear and toward the user's mouth, respectively, and a stabilizer extending from the second region of the headset body, the stabilizer being configured to position the second region at a distance away from the user's cheek. The stabilizer may also facilitate positioning any metal contacts on the headset away from the user's cheek. For example, the stabilizer may be inverted U-shaped to form a channel over the metal contact or may be configured as one or more ribs disposed adjacent to the metal contact. Where the headset is used with an earpiece worn in the ear, the stabilizer may facilitate maintaining the earpiece within the user's ear. The stabilizer may also facilitate in positioning a microphone port away from the user's cheek. The cheek stabilizer may integrally formed with the headset body or may be a component separate from and attached to the headset body.

In another embodiment, an audio device may generally include a body having an audio receiver and an audio transmitter port located at a receiver portion of the body and at a transmitter portion opposite the receiver portion, respectively, and an extension extending from the transmitter portion, the extension being configured to contact a user when the audio device is worn by the user.

These and other features and advantages of the present invention will be presented in more detail in the following detailed description and the accompanying figures which illustrate by way of example principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Cheek stabilizers for audio headsets are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
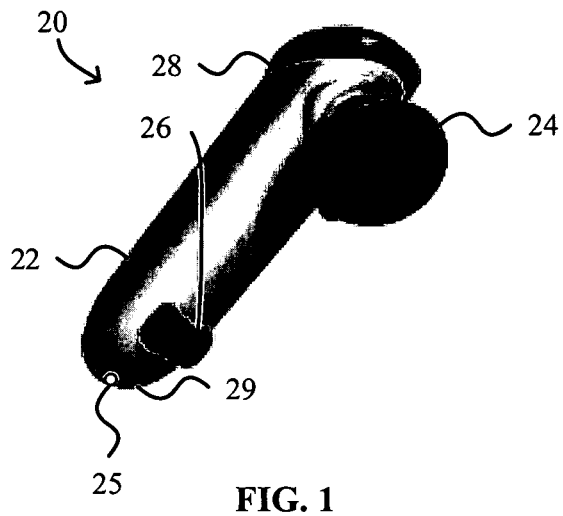
FIGS. 1-3 are perspective, side and back views, respectively, of an illustrative audio output device or headset with a cheek stabilizer.
Figures 2, 3:
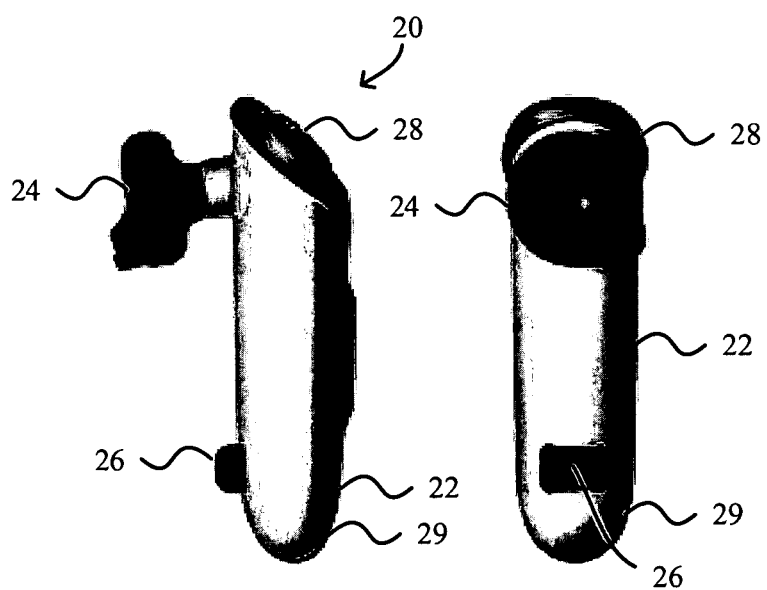

FIGS. 1-3 are perspective, side and back views, respectively, of an illustrative audio output device or headset 20 with a cheek stabilizer or cheek stand-off 26. The headset 20 shown and described herein is merely one illustrative configuration and various other suitable configurations of an audio device intended to be worn on the ear may be implemented with the use of the cheek stabilizer 26. As shown, the headset 20 generally includes a headset body 22, an earpiece or earbud 24 generally located in a receiver region 28, and the cheek stabilizer 26 generally located in a transmitter region 29, e.g., at a bottom or distal end 28 of the headset body 22. To don the headset 20, a user may position the earpiece 24 near the ear or may at least partially insert the earpiece 24 into the ear. A receiver or speaker (not shown) may be located in the earpiece 24 or in the headset body 22 in the receiver region 28. The headset body 22 may also include a microphone port 25 in acoustic communication with a transmitter or microphone. The microphone port 25 and the microphone are typically located in, for example, the transmitter region 29 of the headset body 22. It is noted that although the microphone port 25 is shown to be at an end of the headset body 22, the microphone port 25 may be positioned in other locations in the transmitter region 29 of the headset body 22.

The cheek stabilizer 26 may be generally configured as a raised, bump-like element that acts as a supporting element to facilitate in positioning an inside or back side of the headset body 22 (e.g., the side facing the user's face when worn) a small distance away from the user's cheek or face and/or a small distance away from the user's facial hair that comes in contact with the cheek stabilizer 26. As such, the cheek stabilizer 26 is generally located in the transmitter region 29 on the back side of the headset body 22. As used herein, the user's cheek generally refers to any portion of the user's head between the user's ear and the user's mouth.

The cheek stabilizer 26 may be integrally formed with the headset body 22, e.g., built-in, or may be a separate component assembled onto the back side of the headset body 22 that may or may not be removable by the user from the headset body 22. The cheek stabilizer 26 maybe formed of a hard or flexible material such as elastomer, foam or hard materials such as plastic, or various other suitable materials.

The cheek stabilizer 26 provides an additional or alternative contact point on the user's cheek when the headset is worn on or in the user's ear so as to create increased stability for headset wearing. For example, when the headset 20 is used with the earpiece 24 that is intended to be worn in the ear, the cheek stabilizer 26 may also help push the earpiece 24 into the user's ear with gentle pressure and thus help keep the headset more securely in the user's ear. In addition, the cheek stabilizer 26 also provides a controlled distance between the surface of the user's cheek and the microphone port 25 generally located in the transmitter region 29 of the headset body 22 and thus helps to establish a reliable wearing position for good audio transmission via the microphone. In other words, the cheek stabilizer 26 may also help prevent or reduce blockage of the microphone port 25 by the user's cheek and/or facial hair.

Figure 4:
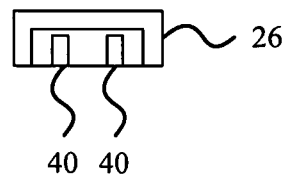
FIG. 4 is an end view of the cheek stabilizer of FIGS. 1-3.

The headset 20 may be a cordless headset with a metal charging pad or metal charging contacts that facilitate in recharging of the cordless headset 20. The metal charging contacts may cause skin irritation and/or allergic reaction if they come into contact with the user's skin (e.g., the cheek). To help prevent such skin irritation and/or allergic reaction, the cheek stabilizer 26 may be configured in a hanger-like or an inverted U-shape so that a channel is formed between the headset body 22 and the cheek stabilizer 26. FIG. 4 is an end view of the cheek stabilizer of FIGS. 1-3. The channel formed between the headset body 22 and the cheek stabilizer 26 may be of such a shape, size and configuration as to generally cover the metal charging contacts and thus prevent contact or touching between the user and the metal charging contacts. The hanger-like or inverted U-shaped cheek stabilizer 26 can be located over the metal charging contacts 40 such that the metal charging contacts 40 are accessible (e.g., via the open ends of the channel) for recharging but are otherwise covered so as to prevent touching or contact with the user's skin. Thus the cheek stabilizer 26 can also be configured to protect the user's skin from contacting or touching the metal charging contacts or pads and thus helps to prevent or reduce possible skin irritation or allergic reaction.

Figure 5:
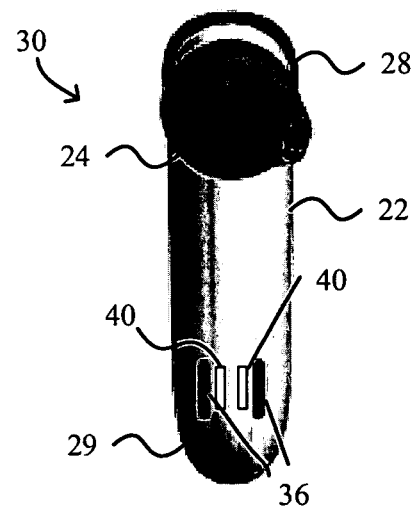
FIG. 5 is a back view of an illustrative audio output device or headset with a cheek stabilizer with an alternative configuration.

FIG. 5 is a back view of an alternative audio output device or headset 30 with a differently configured cheek stabilizer 36. As shown, the headset 30, similar to the headset 20 of FIGS. 1-3, the headset 30 generally includes a headset body 22, an earpiece or earbud 24 generally located in a receiver region 28, and a cheek stabilizer 36 generally located in a transmitter region 29, e.g., at a bottom or distal end 28 of the headset body 22.

The cheek stabilizer 36 may include two or more ribs rather than being of a single-body or single piece construction as with the cheek stabilizer shown in FIGS. 1-4. The metal charging contacts 40, where the headset 30 is a cordless headset, are thus exposed. However, the ribs of the cheek stabilizer 36 may extend further (e.g., higher) than the metal charging contacts 40 such that the cheek stabilizer 36 positions the metal charging contacts 40 at a small distance away from the user's cheek or face and/or a small distance away from the user's facial hair when worn so as to help prevent skin irritation and/or allergic reaction. In addition, the cheek stabilizing ribs 36 may be positioned to flank both sides of the metal charging contacts 40 and thus may further shield the metal charging contacts 40 from the user's cheek or skin when worn.

The cheek stabilizer 36 may similarly be integrally formed with the headset body 22, e.g., built-in, or may be a separate component assembled onto the back side of the headset body 22 that may or may not be removable by the user from the headset body 22. The cheek stabilizer 36 maybe formed of a hard or flexible material such as elastomer, foam or hard materials such as plastic, or various other suitable materials.

Figure 6:
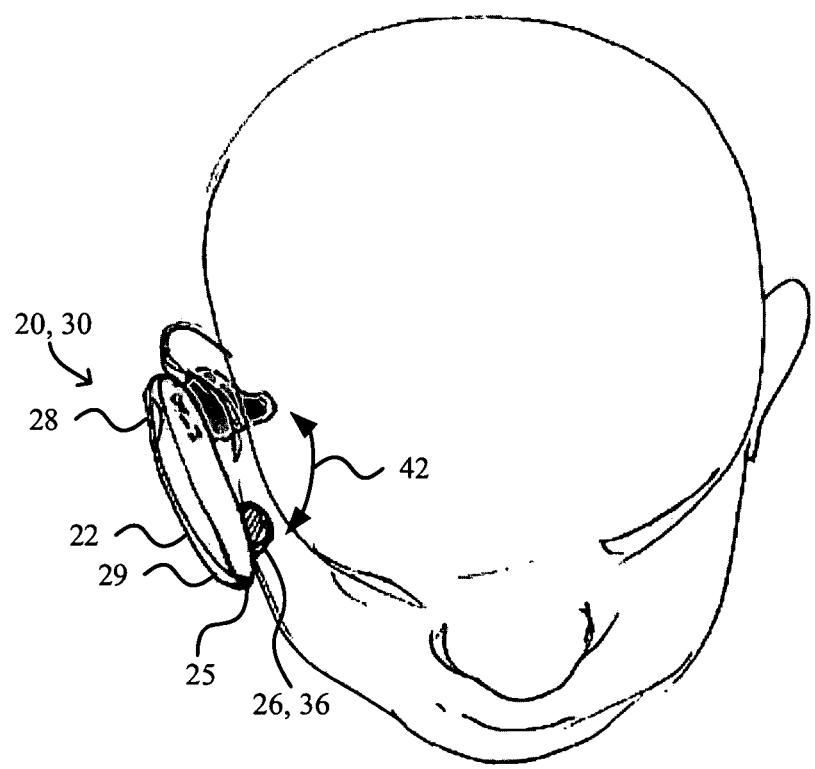
FIG. 6 is an upper front perspective view of an user wearing an audio output device with a cheek stabilizer.

FIG. 6 is an upper front perspective view of an user wearing an audio output device or headset 20, 30 with a cheek stabilizer 26, 36. As shown, the cheek stabilizer 26, 36 positions the headset 20, 30 so that a surface of the headset body 22 adjacent to the user is a small distance away from the user's cheek or face. In addition, the headset 20, may be adjusted by rotating the headset body 22 about a pivot point located at or near the 24 earpiece, as indicated by arrow 42, such that the transmitter region 29 can be optimally positioned near or in a directly toward the user's mouth.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:
1. A cordless audio headset, comprising:
a headset body having a first region configured to be positioned near an ear of a user and an opposing second region configured to be positioned toward a mouth of a user, the headset body having an inside surface configured to be positioned toward the user;
a cheek stabilizer extending from the inside surface and generally positioned in the second region, the cheek stabilizer being configured to protrude from the headset body and position the second region at a distance away from the user;

a metal contact disposed on the headset body, the stabilizer being further configured to position the metal contact at a distance away from the user; and wherein the headset communicates an audio signal wirelessly.

2. The system of claim 1, wherein the stabilizer is generally positioned over the metal contact to prevent the user from touching the metal contact.

3. The system of claim 2, wherein the stabilizer is generally inverted U-shaped to form a channel between the headset body and the stabilizer.

4. The system of claim 1, wherein the stabilizer includes at least one rib disposed adjacent to the at least one metal contact.

5. The system of claim 1, further comprising an earpiece coupled to the headset body in the first region and configured to be at least partially positioned within the user's ear, the stabilizer being further configured to facilitate maintaining the earpiece within the user's ear.

6. The system of claim 1, further comprising a microphone port disposed in a location in the second region of the headset body, the stabilizer being further configured to position the microphone port at a distance away from the user.

7. The system of claim 1, wherein the stabilizer is integrally formed with the headset body.

8. The system of claim 1, wherein the stabilizer is a component separate from and attached to the headset body.

9. A cordless audio device, comprising:

a body having an audio receiver located at a receiver portion of the body for receiving a first audio signal and an audio transmitter port at a transmitter portion opposite the receiver portion of the body for transmitting a second audio signal, wherein the headset communicates the first and second audio signals wirelessly;

a structure coupled to the body for mounting the audio device on the user's ear and an extension extending from the transmitter portion of the body, the extension being configured to protrude from the body and contact a user when the audio device is worn by the user and further configured to position the audio transmitter port at a distance away from the user.

10. The audio device of claim 9, further comprising at least one metal contact disposed on the body, wherein the extension is generally positioned over the metal contact to prevent the user from touching the metal contact.

11. The audio device of claim 10, wherein the extension is generally inverted U-shaped to form a channel between the body and the extension.

12. The audio device of claim 9, further comprising at least one metal contact disposed on the body, the extension being further configured to position the metal contact at a distance away from the user.

13. The audio device of claim 12, wherein the extension includes at least one rib disposed adjacent to the at least one metal contact.

14. The audio device of claim 9, further comprising an earpiece coupled to the body in the receiver portion and configured to be at least partially positioned within an ear of the user, the extension being further configured to facilitate maintaining the earpiece within the user's ear.

15. The audio device of claim 9, wherein the extension is integrally formed with the body.

16. The audio device of claim 9, wherein the extension is a component separate from and attached to the body.

* * * * *